Oct. 27, 1970  R. P. DE FILIPPI ETAL  3,536,611
MEMBRANE DEVICE AND METHOD
Filed Feb. 6, 1967

INVENTORS.
Richard P. deFilippi
Russell W. Pierce
BY
Richard P. Crowley
ATTORNEY

United States Patent Office 3,536,611
Patented Oct. 27, 1970

3,536,611
MEMBRANE DEVICE AND METHOD
Richard P. de Filippi, Weston, and Russell W. Pierce, Norwell, Mass., assignors to Abcor, Inc., Cambridge, Mass., a corporation of Massachusetts
Filed Feb. 6, 1967, Ser. No. 614,083
Int. Cl. B01d *13/00, 31/00*
U.S. Cl. 210—22          23 Claims

ABSTRACT OF THE DISCLOSURE

An improved capillary membrane device wherein a plurality of capillary tubes are woven together into a mat with substantially uniform interstitial spaces between the tubes, and the mat is wrapped around a central perforated distributor tube, the said mat and distributor tube contained within a shell. A sweep stream is introduced into the distributor tube and the feed stream is introduced into and flows through the capillary tubes of the mat essentially parallel to the axis of the distributor tube, while the sweep stream diffuses radially to the axis of the distributor tube and is withdrawn along with the permeate-rich fraction permeating through the capillary walls.

BACKGROUND OF THE INVENTION

Our invention relates to a device and process for the separation of liquids employing membrane permeation techniques. In particular, our invention relates to an improved liquid-liquid capillary membrane device employing a sweep stream moving substantially transverse to the feed stream to be separated.

The use of hollow fibers or tubes of glass and other materials for a great variety of membrane separation processes is well known as evidenced for example, by U.S. Pat. Nos. 3,019,853 and 3,228,877 hereby incorporated by reference. Because of the slow rates of diffusion of gases or liquids through solid membranes, a large amount of membrane surface area is required in order to make practicable separation processes based on permeation techniques. Consequently, so that membrane permeation devices would not be extraordinarily large in size, investigators in the permeation field have sought membrane geometries which would yield high membrane surface-to-volume ratios, such as capillary tubes.

In general, hollow tubes and capillary tubes in particular have been enclosed in a generally parallel-arranged bundle within a shell. A feed mixture has been introduced into one end of the tubes, a permeate-lean fraction removed from the other end of the tubes, while the permeate-rich fraction is removed by the use of a sweep stream introduced into the shell and which flows counter-current to the feed mixture. Such devices have not been wholly satisfactory due in part to non-uniform flow and channeling of the sweep stream, particularly where bundles of small capillary tubes are employed. In addition a concentration gradient of the permeate-rich fraction may be created along the long axis of the tubes. Also, previous techniques encountered difficulties in creating small permeation devices, since compact bundling of the capillary tubes inhibited proper or good fluid flow distribution patterns.

SUMMARY OF THE INVENTION

We have now discovered a new and improved membrane device and method which overcomes many of the foregoing difficulties and which provides an efficient, compact capillary membrane device. Our device and method provides for the diffusion of the sweep stream radial to the axis of the capillary tubes, and the use of capillary tubes with substantially uniform interstitial areas between individual capillary tubes to promote good sweep-stream flow distribution and to minimize channeling.

In one embodiment a central distributor tube characterized by a plurality of flow passages radially arranged therein is used in combination with an encircling permeation membrane, such as a bundle of capillary tubes generally parallel to the distributor tube. A fluid sweep stream is introduced into both ends of the distributor tube, and said sweep stream flows radially outward from the distributor tube substantially perpendicular to the flow of the feed stream in the surrounding capillary tubes. If desired, a portion of the sweep stream may be withdrawn from the opposite end of the distributor tube, rather than being fed in both ends, and recycled to the inlet. The radial diffusing of the sweep stream with a membrane device inhibits channeling and provides good contacting and fluid flow distribution over the membrane surface. The diffused sweep stream and the permeate-rich fraction of the feed stream are recovered from the external shell, while the permeate-lean feed stream fraction is recovered from the other end of the capillaries. The flow passages are generally uniformly distributed about the tube axis but may be varied. The distributor may be a tube with definite flow passages or a sintered or porous metal, ceramic or plastic tube.

In another embodiment of our invention hollow tubes, particularly flexible capillary tubes, are arranged in a geometric pattern wherein the tubes are fixed in a regular contacting form or pattern with substantially uniform interstitial open areas between individual tubes or between groups of tubes. Such tubes either woven, sintered, braided, knitted, glued, or otherwise secured and formed, and generally in mat or sheet form with the tubes substantially parallel, are usefully employed in a membrane device. The pattern so formed permits good fluid distribution within the device particularly where a sweep stream is used. The open pattern prevents or minimizes channeling and promotes the removal of the permeate-rich fraction from the capillary walls since a more effectively used membrane surface area is provided over the use of randomly bunched tubes. The mat of tubes may be rolled into a convoluted mat or tube with the tube ends potted in resin to serve as headers for the introduction and withdrawal of the feed stream and the permeate-lean fraction. The sweep stream is introduced into the one end and withdrawn from the other end permeate enriched. When necessary, the mat may be used in flat sheet form or supported by rolled or flat screens within a shell.

In a preferred embodiment an improved membrane device is provided by the combination of a central distributor tube and a mat of capillary tubes as described encircling the central tube one or more times. Such arrangement provides radial diffusion of the sweep stream and effective flow distribution without channeling. Our invention will be described in connection with the embodiment which provides an efficient compact membrane device operable for the separation by permeation techniques of a variety of feed mixtures such as those separations set forth in the patents incorporated by reference and other separations. Such devices with the selection of proper membrane material may be used for the dialysis of body fluids such as the elimination of waste fluids from the blood.

Our invention eliminates many of the difficulties associated in the past with the development of an effective membrane separation device based on tube or capillary membranes.

An object of our invention is to provide an efficient, compact and economical means for the separation of liquid mixtures in a membrane process.

One object of our invention is to provide a device and method for the separation and concentration of various isomers and fractions from liquid feed streams, such as the separation of para and meta xylene fractions and the dialysis of body fluids such as blood.

A further object of our invention is to provide an improved membrane device employing capillary tubes as the membrane which tubes are so formed to inhibit channeling of the sweep stream.

Another object of our invention is to provide an improved method and device for membrane separation processes wherein a liquid sweep stream is diffused radially about the capillary tubes to promote good flow distribution.

These and other objects of our invention will be apparent to those persons skilled in the art from the following more detailed description of our invention taken in conjunction with the accompanying drawing wherein:

DESCRIPTION OF THE PREFERRED EMBODIMENTS

Figure 1:
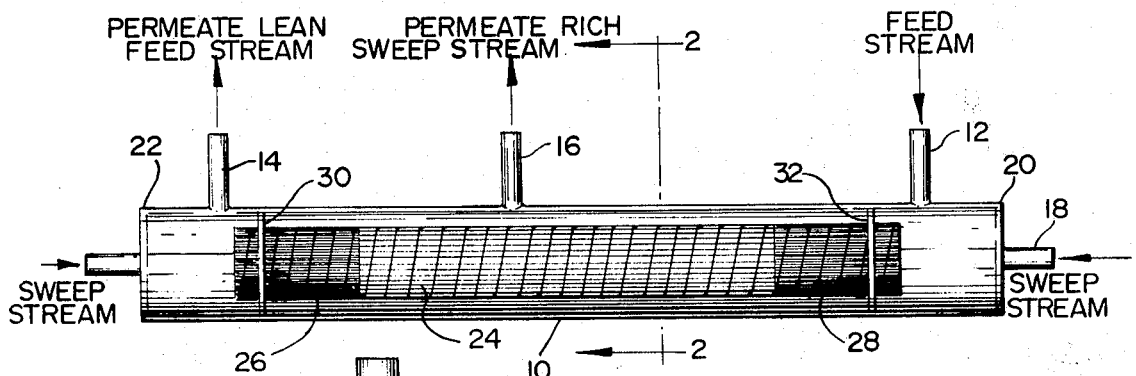
FIG. 1 is a schematic plan view of our invention.
Figure 2:
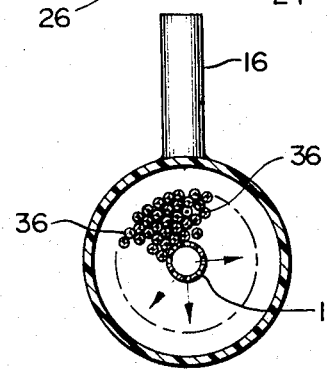
FIG. 2 is a cross sectional view of FIG. 1 taken along the lines 2—2.
Figure 6:
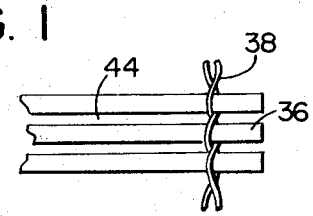
FIG. 6 is an enlarged fragmentary view of the woven mat.

In the separation of liquids using solid membrane techniques, the rate of diffusion of the gas or liquid to be separated is usually very slow, and accordingly, the surface area of the membrane must be very large. In order to design a membrane device which would not be unwieldy, capillary membranes are used to provide a geometry which allows a compact unit to be built.

In order to allow a close approach to maximum efficient use of the shell side capillary area by uniform flow distribution of the sweep fluid, our invention incorporates a woven mat of capillary tubes about a central distributor. This woven mat presents a uniform resistance to the flow of the sweep stream and this prevents or inhibits channeling of the liquid sweep stream.

The capillary tubes are usually woven into a mat with the tubes being generally parallel to each other. The interstitial open areas in the woven mat generally are about the same dimensions as the diameter of the weaving material used or my range from 0.1 to 10 times such diameter, with the open area size not generally critical so long as the area is uniform so as to inhibit channeling. For compact devices, the tubes should be formed into a compact mat. Where the size of the device is not a factor large open areas may be used. The size and number of the tubes depends on design criteria for the device and the system and may be varied as desired.

A central distributor or a perforated tube is placed at the central axis of the bundle of capillary tubes. The sweep stream then diffuses radially outward from the tube axis and this also prevents channeling of the sweep stream along the interior walls of the shell.

In general, a plurality of capillaries are sealed in common headers. The ends of the capillaries at both ends of the bundle are joined in common headers prepared from polymers such as a thermosetting or epoxy resin which allows the formation of the headers with substantial absence of plugging of the capillaries. The thermosetting or potting resin is hardened into a solid, and then cut through the cross section to expose the open ends of the individual capillary tubes encased in the resin. The headers allow a good seal to be made between the tube ends and the shell enclosing the capillary bundle.

In operation, a feed stream to be separated is introduced into one end of the capillary tubes and the permeate-lean fraction is withdrawn from the opposite end.

A permeate-rich fraction is removed with the sweep stream from the shell. The sweep stream is introduced into both ends of the central distributor and diffuses radially outwardly from the axis and through the interstitial open spaces to provide maximum contact of the sweep stream with the external tube surfaces. Of course if desired, a pluraliy of distributors and mats may be employed in a single shell. In our device the capillary wall is the membrane, the feed zone is within the tubes, and the permeate zone, the space within the shell and the outside of the tubes. Further it is recognized that the feed stream may be used in the distributor and the sweep stream introduced into the capillary tubes which would then make the interior of the tubes the permeate zone.

Referring to the drawing, our invention comprises in combination an outer shell 10 with an inlet 12 for the introduction of a feed stream, an outlet 14 for the discharge of a permeate-lean feed stream and an outlet 16 for the discharge of a permeate-rich sweep stream. A central distributor 18 characterized by a plurality of openings 34 passes through the center of the shell 10 and is secured to either end of the shell by suitable seals 20 and 22. A woven bundle 24 of capillary membrane tubes 36 is wrapped around the central distributor. The bundle has resin headers 26 and 28 at either end thereof. Seals 30 and 32 within the shell surround the headers 26 and 28 respectively forming fluid tight chambers within the shell so that a feed stream may be introduced into one end of the tubes and the permeate-lean fraction withdrawn from the other end.

Figure 3:
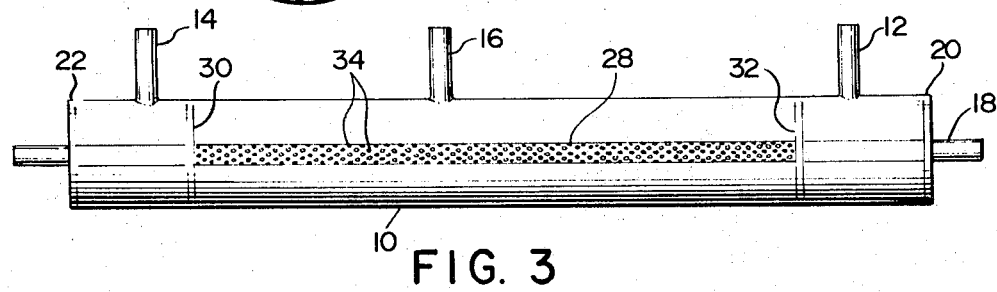
FIG. 3 is a schematic plan view of our invention without the membrane mat.
Figure 4:
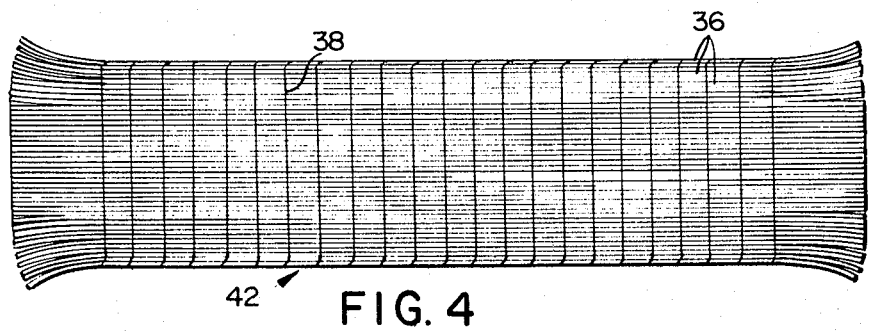
FIG. 4 is a plan view of the woven membrane.

The operation of our invention will be described using polypropylene capillaries, having an inside diameter of 5.5 mils and 10 mils in outside diameter. As shown in FIG. 4, the capillary tubes 36 are woven with a nylon thread 38 to form mat 42. The thread 38 circumferentially surrounds each tube thereby providing the dimensions of the uniform interstitial area 44 between tubes. The mat 42 is then rolled to form bundle 24 and the ends are treated with a resinous material to form common headers 26 and 28. Assembled as shown in FIG. 1, a feed stream such as a mixture of para and meta xylene is introduced at 70° F. through conduit 12 into the shell 10. The seal 32 prevents the feed stream from entering the inner chamber of the shell. A liquid sweep stream sulfolane is introduced into both ends of the central distributor 18 having a diameter of ⅛″ and flows radially out from the axis of the distributor through the perforations 34 which have a diameter of ⅟₁₆″. This radial flow of the sweep fluid combined with resistance offered by the woven mat provides for uniform fluid flow over the shell side of the capillary tubes. The tubes, being woven, are prevented from moving apart. The perforations 34 in the central passageway 18 are shown in FIG. 3. There are no apertures located outside the seals 30 and 32 to prevent mixing of the feed and sweep streams. As the feed stream flows through the capillary tubes the para xylene preferentially permeates through the membrane and diffuses into the radially diffusing liquid sweep stream. The permeate-lean stream then passes through outlet 14 to a suitable receptacle for recycle in this or another stage, or for recovery to be used in another process. The liquid sweep stream enriched in para xylene is removed through outlet 16.

Our invention may also be operated by introducing the feed stream into both ends of the tube element 18 and introducing the sweep stream through inlet 12. In this manner the component in the feed stream to be extracted would permeate through the capillary tubes and diffuse into the sweep stream flowing through the capillary tubes. The permeate enriched sweep stream would then flow through outlet 14 and the permeate-lean feed stream would flow through outlet 16.

The flow rate of the liquid material through the central distributor may be controlled so that the opening on the end of the central distributor opposite the feed end is not needed. That is all the liquid material would radially flow by the capillary tubes and out through outlet 16.

Figure 5:
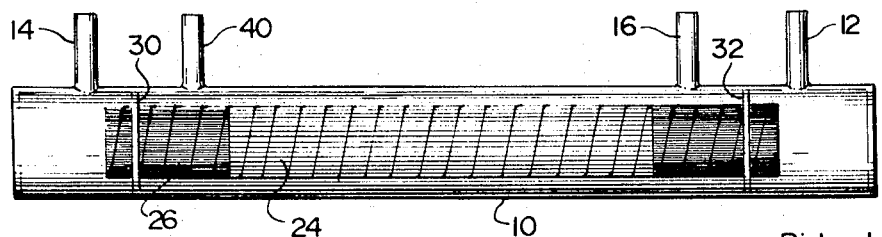
FIG. 5 is a schematic plan view of a variation of our invention.

A variation of the preferred embodiment is shown in FIG. 5. In this embodiment, the central distributor is omitted. The feed material enters through inlet 12 and passes through the capillary tubes, the fraction to be separated permeating through the walls of the tubes. The sweep stream enters inlet 16. The permeate fraction diffuses into the sweep stream and the permeate enriched sweep stream passes through outlet 40. The permeate-lean feed stream passes through outlet 14. Of course it is understood that the flow of the sweep stream may be countercurrent to the flow of the feed stream and the feed stream may pass over the outside of the capillary tubes and the sweep stream flow in the tubes in either concurrent or countercurrent flow.

As shown in FIG. 3, the central distributor is characterized by a plurality of uniformly arranged openings of the same size. It should be understood that the central distributor used in our invention can be any porous material such as a sintered metal or polymeric fibers or particles. Also the location and size of the openings in the tube may vary depending upon the pressure and properties of the fluid stream introduced into the tube. The central distributor need not be a cylindrical tube as shown as long as a conduit is provided which allows radial diffusion along its length of the fluid passing through. For example, an elliptical, diamond shaped, or rectangular conduit could be utilized. The central distributor to some degree gives strength and support to the woven mat.

FIG. 4 shows the preferred embodiment of the woven mat used in our invention. However, it is to be realized that various weave patterns or a braid can be utilized and the capillary tubes may be interwoven or woven with a foreign filament such as a metal strand or nylon thread for support as long as the weave provides a generally uniform interstitial area between the individual tubes or between groups of tubes. Also the mat could be formed by heat sintered tubes or by otherwise securing and forming said tubes in mat or sheet form.

The size of the tubes may vary, depending upon the design features desired, from about one mil to one inch. The very small tubes are most easily arranged in a woven mat and are best suited for composite desgins. However, with the larger diameter tubes, it may be more desirable to use a spider or block arrangement to support and spatially separate the tubes either individually or collectively.

Our invention has been described and shown, FIGS. 1 and 5, with the capillary tubes generally parallel to one another and parallel to the axis of the central distributor. However, the tubes may be twisted in helical form about the central distributor. Also a plurality of woven mats either about a central distributor as shown in FIG. 1 or alone as shown in FIG. 5, or in combination thereof may be used within one shell. A further embodiment of our invention is to have a plurality of non-woven capillary tubes in longitudinal alignment tbout the central distributor similar to the embodiment shown in FIG. 1.

The particular design of our invention depends upon the permeation system, e.g., the solute sought to be separated.

The composition of the capillary tubes may be of organic or inorganic materials which exhibit selective permeation toward the components of the mixture to be separated. Typical membrane materials which may be used, include, but are not limited to: $C_2$–$C_4$ olefinic resins such as polyethylene, polypropylene, ethylene-propylene, ethylene-butene, and ethylene-propylene terpolymers; polyamides such as nylon; polyesters such as Mylar; fluorocarbon polymers such as Teflon; acrylic resins; styrene resins such as polystyrene; rubber such as neoprene; chloroprene, butyl rubber, polybutadiene, copolymers of bnutadiene with styrene, butadiene-nitrile copolymers, silicone rubbers and other natural and synthetic elastomers, and cellulose derivatives such as cellulose ethers and esters such as hydroxyl cellulose, ethyl cellulose, cellulose acetate and cellulose acetate butyrate, vinyl chloride resins, such as Saran, polyvinyl chloride; vinyl chloride, vinyl acetate copolymers, vinyl acetate resins like polyvinyl acetate, urethanes, ion exchange resins, glass, ceramics, metals and the like.

The liquid feed material may be any feed mixtures, aqueous or non-aqueous, separable by semi-permeable membrane techniques. The feed mixtures may be continuously or intermittently introduced into the feed zone. The liquid mixtures may include various petroleum fractions, naphthas, oils, hydrocarbon mixtures, as well as other liquid mixtures including chemical reaction mixtures, mixtures of branched and straight-chain compounds, mixtures of structural, positional and other isomers, azeotropic mixtures, and the like. The criterion for the selection of a suitable liquid solvent for our process includes low membrane permeability relative to the permeability of the mixture to be separated and at least moderate solvent power with the permeate-enriched fraction. It is also desirable to use a liquid of reasonably low viscosity to help reduce pumping costs and other requirements.

Our process may be used for the improvement in octane number of gasoline blending stocks by the selective removal of low-octane components from naphtha. Our process is also applicable to the removal of aromatics from kerosene to enhance the smoke point or extraction of normal hydrocarbon to lower the freezing point of various petroleum fractions. For example, jet fuel yield may be increased by bringing within the specifications gasoline derived from paraffinic crudes by increasing jet fuel end points, while maintaining the necessary product quality. Our process may also be used for separating or removing reaction products from a reaction mixture in order to enhance the selectivity of the reaction or to shift the chemical equilibrium of the reaction.

Our device may be also used in the dialysis of body fluids such as hemodialysis wherein the solutes and excess water in the blood permeate through the membrane and diffuse into the dialysate or aqueous saline sweep liquid and are carried away.

Our invention may also be used to separate normally gaseous solutes from liquid or gaseous solutions, and with a gaseous sweep stream.

Our invention as described and illustrated is a significant improvement of the prior art permeation devices and processes. We have developed an economical, efficient and compact permeation device which incorporates a woven mat of capillary tubes which mat is wrapped around a central distributor. The central distributor imparts a radial flow to the fluid passing therethrough. The radical flow and the woven mat inhibit channeling and provide maximum flow over the shell side of the capillary membrane device.

What is claimed is:

1. A membrane device which comprises in combination:
   (a) a shell element;
   (b) an elongated distributor tube disposed within the shell and characterized by a plurality of radian flow passages therein;
   (c) a plurality of membrane tubes within the shell and positioned circumferentially about the distributor tube, and generally parallel to the axis of the distributor tube, the membrane tubes defining a feed zone and a permeate zone, the membrane wall of the tubes adapted to separate a feed stream into a permeate-rich and permeate-lean fraction;
   (d) means to introduce a fluid sweep stream into the peremate-zone;
   (e) means to introduce a feed stream to be separated into the feed zone; and
   (f) means to withdraw a permeat-lean fraction from the feed zone and a sweep fluid from the permeate zone; said membrane tubes being in mat form, the mat being characterized by generally uniform open interstitial spaces between the tubes; whereby the stream introduced into the distributor tube is radially diffused in the shell.

2. The device of claim 1 wherein the membrane tubes include a plurality of flexible capillary tubes.

3. The device of claim 1 wherein the means to introduce a fluid sweep stream into the permeat-rich zone includes an inlet at either end of the distributor tube, and the device includes an outlet whereby the sweep stream is introduced into both inlets of the distributor tube and the permeate-rich sweep stream passes through the outlet.

4. The device of claim 1 wherein the tubes are enclosed in fluid-tight header elements at either end thereof to define spatially separate means at opposite ends of the shell to introduce the feed stream into the interior of the tubes and withdraw the permeate-lean portion at the other end thereof.

5. The device of claim 1 wherein the shell is an elongated shell element having means to introduce the feed stream and means to discharge the permeate-lean feed stream from the interior of the tubes, each means being at opposite ends of the shell and means to discharge a permeate-rich sweep stream; the distributor tube is characterized by a plurality of predetermined radial openings therein; and the membrane tubes are comprised of a plurality of flexible plastic capillary tubes in mat form, said mat circumferentially surrounding the distributor, the axis of the tubes in the mat essentially parallel to the axis of the distributor, the mat characterized by generally uniform and open interstitial spaces between the tubes, whereby the feed stream may be introduced into the capillary tubes, the permeate-rich fraction of the feed stream permeating through the walls of the tubes, the permeate-lean stream discharged from the tubes and the sweep stream entring both ends of the distributor tube and radially diffusing through the mat, with the permeate-rich fraction and diffused sweep stream being discharged from said shell.

6. The device of claim 1 wherein the tubes are flexible plastic capillary tubes in a woven mat, the mat wrapped about the distributor tube, with the axis of the tubes generally parallel to the axis of the distributor.

7. The device of claim 6 wherein the tubes are capillary tubes and are helically twisted about the distributor tube.

8. A membrane apparatus which comprises in combination:
 (a) a shell element;
 (b) a plurality of membrane tubes in the shell, the tubes arranged generally parallel to each other within the shell, the tubes defining a feed zone and a permeate zone, the membrance wall of the tube adapted to separate a feed stream into a permeate-rich and a permeate-lean fraction, the tubes in a mat form, the mat characterized by generally uniform open interstitial spaces in the mat;
 (c) means to introduce a feed stream into the feed zone;
 (d) means to withdraw a permeate-lean fraction from the feed zone; and
 (e) means to withdraw a permeate-rich fraction from the permeate-zone.

9. The apparatus of claim 8 which includes:
a means to introduce a fluid sweep stream into the permeate-zone.

10. The apparatus of claim 8 which the membrane tubes are flexible plastic capillary tubes, the mat of tubes in a roll in the shell, with each end of the tubes encased in a fluid-tight header whereby a feed stream may be introduced into the interior of the tubes at the one end of the shell and the permeate-lean fraction may be withdrawn from the interior of the tubes at the other end of the shell.

11. The apparatus of claim 8 which includes a central distributor tube characterized by a plurality of radial flow passages therein, the mat of tubes surrounding the distributor tube.

12. In the process of separating a feed stream into a permeate-rich and a permeate-lean fraction by a plurality of membrane capillary tubes in a shell in which the tubes define a permeate zone and a feed zone, the membrane tube material selected to provide for the separation of the feed stream and substantially all of the tubes arranged generally parallel to each other the improvement which comprises:
 separating the capillary tubes in a predetermined manner along their axial length with an interwoven material to provide for a plurality of generally uniform interstitial open spaces between the parallel capillary tubes thereby permitting enhanced distribution of the streams during the process.

13. The method of claim 12 wherein the feed stream comprises a meta-para xylene and in which method a sweep stream is employed and the sweep stream comprises a liquid hydrocarbon stream.

14. The method of claim 12 wherein the feed stream comprises a $C_4$ hydrocarbon stream containing isobutylene and in which method a sweep stream is employed and the sweep stream comprises a liquid hydrocarbon stream.

15. The method of claim 12 wherein feed stream is a body fluid such as blood and in which method a sweep stream is employed and the sweep stream is an aqueous saline liquid stream.

16. The method of claim 12 which includes:
providing such open spaces between groups of the capillary tubes.

17. The method of claim 12 which includes:
employing a sweep stream in the permeate zone; and
diffusing generally radially to the axis of the capillary membrane tubes the feed or sweep stream thereby promoting good flow distribution of the feed and sweep streams in the membrane process.

18. The method of claim 12 which includes:
providing a distributor tube characterized by a plurality of flow passages therein substantially along the axis; and
wrapping about such tube in a generally uniform-spaced manner, a plurality of capillary tubes in a convoluted mat form, the mat characterized by containing said open spaces.

19. The method of claim 12 which includes:
employing a sweep stream in the permeate zone.

20. The method of claim 12 wherein the membrane capillary tubes comprise polymeric material selected from the group consisting of olefinic resins, fluorcarbon polymers, silicone rubbers, vinyl chloride resins, cellulose ethers and cellulose esters, the tubes having a wall thickness of between about 1 to 15 mils.

21. The method of claim 12 which includes:
inserting the capillary tubes into a potting resin;
hardening said resin containing the capillary tubes;
cutting the hardened resin to expose the open ends of the inserted tubes to form a header at each end of the capillary tubes; and
employing said tubes encased in said header in the shell.

22. The method of claim 12 which includes:
weaving the capillary tubes into a sheet-like mat form to provide the open spaces between the tubes.

23. The method of claim 22 which includes:
arranging the capillary tubes in a convoluted form within the shell.

(References on following page)

References Cited

UNITED STATES PATENTS

| | | | |
|---|---|---|---|
| 2,734,592 | 2/1956 | Jones | 55—158 |
| 2,911,057 | 11/1959 | Green et al. | 55—158 |
| 3,226,915 | 1/1966 | Pinney et al. | 55—158 |
| 3,262,251 | 7/1966 | Hicks | 55—158 |
| 3,276,996 | 10/1966 | Lazare | 210—22 |
| 3,342,729 | 9/1967 | Strand | 210—321 X |
| 3,422,008 | 1/1969 | McLain | 210—23 X |
| 3,228,876 | 1/1966 | Mahon | 210—321 X |

REUBEN FRIEDMAN, Primary Examiner

F. A. SPEAR, Jr., Assistant Examiner

U.S. Cl. X.R.

210—321

UNITED STATES PATENT OFFICE
CERTIFICATE OF CORRECTION

Patent No. 3,536,611                                     October 27, 1970

Richard P. De Filippi et al.

It is certified that error appears in the above identified patent and that said Letters Patent are hereby corrected as shown below:

In the heading to the printed specification, lines 4 and 5, "assignors to Abcor, Inc., Cambridge, Mass., a corporation of Massachusetts" should read -- assignor, by mesne assignments, to Johnson & Johnson, New Brunswick, N. J., a corporation of New Jersey --.

Signed and sealed this 30th day of March 1971.

(SEAL)
Attest:

EDWARD M. FLETCHER, JR.                      WILLIAM E. SCHUYLER, JR.
Attesting Officer                               Commissioner of Patents